United States Patent
Mihan et al.

(10) Patent No.: US 12,187,877 B2
(45) Date of Patent: Jan. 7, 2025

(54) EXTRUSION ADDITIVE MANUFACTURING PROCESS FOR PRODUCING POLYETHYLENE ARTICLES

(71) Applicants: Basell Polyolefine GmbH, Wesseling (DE); Albert-Ludwigs-Universität Freiburg, Freiburg (DE)

(72) Inventors: Shahram Mihan, Bad Soden (DE); Erik Hans Licht, Mainz (DE); Rolf Mülhaupt, Freiburg (DE); Carl Gunther Schirmeister, Denzlingen (DE); Timo Hees, Freiburg (DE)

(73) Assignees: Basell Polyolefine GmbH, Wesseling (DE); Albert-Ludwigs-Universität Freiburg, Freiburg (DE)

( * ) Notice: Subject to any disclaimer, the term of this patent is extended or adjusted under 35 U.S.C. 154(b) by 529 days.

(21) Appl. No.: 17/432,392

(22) PCT Filed: Feb. 12, 2020

(86) PCT No.: PCT/EP2020/053521
§ 371 (c)(1),
(2) Date: Aug. 19, 2021

(87) PCT Pub. No.: WO2020/169423
PCT Pub. Date: Aug. 27, 2020

(65) Prior Publication Data
US 2022/0259416 A1   Aug. 18, 2022

(30) Foreign Application Priority Data
Feb. 20, 2019   (EP) .................................... 19158288

(51) Int. Cl.
| C08L 23/06 | (2006.01) |
| B29C 64/118 | (2017.01) |
| B33Y 10/00 | (2015.01) |
| B33Y 70/00 | (2020.01) |
| B29K 23/00 | (2006.01) |

(52) U.S. Cl.
CPC ............ C08L 23/06 (2013.01); B29C 64/118 (2017.08); B33Y 10/00 (2014.12); B33Y 70/00 (2014.12); B29K 2023/0658 (2013.01); C08L 2205/025 (2013.01); C08L 2205/03 (2013.01)

(58) Field of Classification Search
None
See application file for complete search history.

(56) References Cited

U.S. PATENT DOCUMENTS

| 2016/0297935 A1 | 10/2016 | Reese et al. |
| 2017/0096576 A1 | 4/2017 | Bheda et al. |
| 2018/0142070 A1 | 5/2018 | Reese et al. |
| 2018/0187000 A1 | 7/2018 | Li et al. |
| 2018/0327552 A1 | 11/2018 | Reese et al. |
| 2020/0279671 A1* | 9/2020 | Doufas ................ B29C 48/022 |

FOREIGN PATENT DOCUMENTS

| CN | 103980595 B | 7/2015 |
| EP | 1153968 A1 | 11/2001 |
| EP | 1188762 A1 | 3/2002 |
| RU | 2674019 C1 | 12/2018 |
| WO | 9704015 A1 | 2/1997 |
| WO | 0121668 A1 | 3/2001 |
| WO | 2005103096 A1 | 11/2005 |
| WO | 2011089017 A1 | 7/2011 |
| WO | 2017068415 A1 | 4/2017 |
| WO | 2017173258 A1 | 10/2017 |
| WO | 2018075320 A1 | 4/2018 |

OTHER PUBLICATIONS

M. S. Ramli et al; FDM Preparation of Bio-Compatible UHMWPE Polymer for Artificial Implant, ARPN J. Eng. Appl. Sci., May 3, 2016, pp. 5474-5480, XP055606794.
Timo Hees et al; Wear Resistant All-PE Single-Component Composites via 1D Nanostructure Formation During Melt Processing, Polymer, Elsevier Science Publishers B.V., GB, vol. 151, Jul. 24, 2018, pp. 47-55, XP085447646, ISSN: 0032-3861, DOI: 10.1016/J.Polymer.2018.07.057.
The International Search Report and Written Opinion for PCT/EP2020/053521 mailed Apr. 14, 2020.

* cited by examiner

*Primary Examiner* — Alison L Hindenlang
*Assistant Examiner* — Adrien J Bernard

(57) ABSTRACT

An extrusion additive manufacturing process including the step of extruding a polyethylene composition having a melt flow index MIE of at least 0.1 g/10 min., the composition made from or containing:
A) from 1% to 40% by weight of a polyethylene component having a weight average molar mass $M_w$, as measured by GPC (Gel Permeation Chromatography), equal to or higher than 1,000,000 g/mol;
B) from 1% to 95% by weight of a polyethylene component having a $M_w$ value from 50,000 to 500,000 g/mol; and
C) from 1% to 59% by weight of a polyethylene component having a $M_w$ value equal to or lower than 5,000 g/mol.

8 Claims, No Drawings

EXTRUSION ADDITIVE MANUFACTURING PROCESS FOR PRODUCING POLYETHYLENE ARTICLES

This application is the U.S. National Phase of PCT International Application PCT/EP2020/053521, filed Feb. 12, 2020, claiming benefit of priority to European Patent Application No. 19158288.1, filed Feb. 20, 2019, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to an extrusion additive manufacturing process, polyethylene compositions, and filaments.

BACKGROUND OF THE INVENTION 3D printing is an evolving technology. Various techniques are listed in VDI 3405 and DIN EN ISO/ASTM 52900.

An extrusion-based 3D printer is used to build a 3D-printed article from a digital representation of the 3D article in a layer-by-layer manner by extruding a flowable build material. The build material is molten and extruded through an extrusion die carried by an extrusion head and then deposited as a sequence of layers, also called "roads" on a substrate in an x-y plane. The extruded build material fuses to previously-deposited build material and solidifies upon a drop in temperature. The distance of the extrusion head relative to the substrate is then incremented along the z-axis (perpendicular to the x-y plane) and the process is then repeated to form a 3D article resembling the digital representation. In some alternative instances, the substrate moves and the extrusion die is stationary. Notably, a filament-free extrusion based 3D printing process is commercially available from ARBURG GmbH & Co. KG.

Movement of the extrusion head with respect to the substrate is performed under computer control, in accordance with build data that represents the 3D article. The build data is obtained by initially slicing the digital representation of the 3D article into multiple horizontally sliced layers. Then, for each sliced layer, the host computer generates a build path for depositing roads of build material to form the 3D article.

In some instances, the extrusion additive manufacturing process is the Fused Deposition Modeling (FDM), also known as Fused Filament Fabrication (FFF), wherein the build material is fed to the extrusion section in form of a filament.

In some instances, a change to the material of the filament also changes the final mechanical and aesthetic properties of the finished object.

In some instances, filaments of polylactic acid (PLA) or acrylonitrile, butadiene, styrene (ABS) polymer or polyamides are used.

In some instances, the filament has a constant diameter or shape along the filament's length, thereby allowing fine tuning of the amount of material in the printed object.

In some instances, polyolefins, like polyethylene, are processable with extrusion-based 3D printers. In some instances, the resulting printed articles have mechanical properties that are deficient when compared to the properties of injection-molded articles.

SUMMARY OF THE INVENTION

In a general embodiment, the present disclosure provides an extrusion additive manufacturing process including the step of extruding a polyethylene composition (I) having a melt flow index MIE at 190° C. with a load of 2.16 kg, according to ISO 1133-2:2011, of at least 0.1 g/10 min., the polyethylene composition made from or containing:
A) from 1% to 40% by weight of a polyethylene component having a weight average molar mass $M_w$, as measured by GPC (Gel Permeation Chromatography), equal to or higher than 1,000,000 g/mol;
B) from 1% to 95% by weight of a polyethylene component having a $M_w$ value from 50,000 to 500,000 g/mol; and
C) from 1% to 59% by weight of a polyethylene component having a $M_w$ value equal to or lower than 5,000 g/mol;
wherein the amounts of components A), B) and C) are referred to the total weight of A)+B)+C), which amounts to 100%.

In some embodiments, the extrusion additive manufacturing process is an extrusion-based 3D printing process.

DETAILED DESCRIPTION OF THE INVENTION

The polyethylene composition (I) is a multimodal composition made from or containing polyethylene components having different molecular weights.

In some embodiments, the polyethylene components are selected from the group consisting of ethylene homopolymers and ethylene copolymers. In some embodiments, the polyethylene component A), B) and C) are selected from the group consisting of ethylene homopolymers and ethylene copolymers.

As used herein, the term "copolymer" includes ethylene polymers containing one or more kinds of comonomers.

In some embodiments, the comonomer or comonomers present in the ethylene copolymers are selected from olefins having formula $CH_2=CHR$ wherein R is an alkyl radical, linear or branched, having from 1 to 10 carbon atoms.

In some embodiments, the comonomers are selected from the group consisting of propylene, butene-1, pentene-1, 4-methylpentene-1, hexene-1, octene-1 and decene-1. In some embodiments, the comonomer is hexene-1.

In some embodiments, the amounts of polyethylene components A), B) and C) in the polyethylene composition (I) are from 4% to 35% by weight of A), from 50% to 95%, alternatively from 64% to 95% by weight, of B) and from 1% to 40%, alternatively from 1% to 30% by weight, of C), wherein the amounts of components A), B) and C) are referred to the total weight of A)+B)+C), which amounts to 100%.

In some embodiments, the polyethylene components A) and C) are present in the polyethylene composition (I) in a weight ratio A)/C) of 5 or lower, alternatively of 3 or lower, alternatively from 0.5 to 5, alternatively from 0.5 to 3.5, alternatively from 0.5 to 3.

In some embodiments, the polyethylene component A) shows a GPC peak (GPC peak (1)) at a molecular weight of from 1,000,000 to 3,000,000 g/mole, alternatively from 1,000,000 to 2,500,000 g/mole.

As used herein, the term "UHMWPE" refers to a polyethylene composition made from or containing an ethylene polymer fraction having ultra-high molecular weights. The $M_w$ values of polyethylene component A) reveals the presence of UHMWPE.

In some embodiments, $M_w$ values for polyethylene component A) are equal to or higher than 1,500,000 g/mole, alternatively equal to or higher than 1,800,000 g/mole, alternatively
from 1,500,000 to 6,000,000 g/mole; alternatively
from 1,500,000 to 4,500,000 g/mole; alternatively
from 1,800,000 to 6,000,000 g/mole; alternatively
from 1,800,000 to 4,500,000 g/mole.

In some embodiments, $M_w/M_n$ values for polyethylene component A) are equal to or less than 5, alternatively from 5 to 1.2, alternatively from 5 to 1.5, wherein $M_n$ is the number average molar mass, measured by GPC.

In some embodiments, the polyethylene component C) shows a GPC peak (GPC peak (2)) at a molecular weight of from 700 to 2,500 g/mole, alternatively from 700 to 1,500 g/mole.

In some embodiments, the $M_w$ values for polyethylene component C) are:
from 800 to 5,000 g/mole, alternatively
from 800 to 3,000 g/mole, alternatively
from 1,000 to 5,000 g/mole, alternatively
from 1,000 to 3,000 g/mole.

In some embodiments, the $M_w/M_n$ values for polyethylene component C) are equal to or less than 5, alternatively from 5 to 1.2, or from 5 to 1.5.

In some embodiments, the polyethylene composition (I) has a density from 0.900 to 0.965 g/cm$^3$, alternatively from 0.930 to 0.960 g/cm$^3$, determined according to ISO 1183-1:2012 at 23° C. In some embodiments, each of the polyethylene components A), B) and C) has a density from 0.900 to 0.965 g/cm$^3$, alternatively from 0.930 to 0.960 g/cm$^3$.

In some embodiments, an upper limit for the density of the polyethylene component A) is 0.950 g/cm$^3$, alternatively 0.940 g/cm$^3$.

In some embodiments, the polyethylene component A) and/or the polyethylene component C) are ethylene homopolymers.

In some embodiments, the MIE values for the polyethylene composition (I) are from 0.1 to 100 g/10 min., alternatively from 0.1 to 50 g/10 min. In some embodiments, the polyethylene composition (I) has a melt flow index MIE at 190° C. with a load of 2.16 kg, according to ISO 1133-2: 2011, of at least 0.5 g/10 min., alternatively from 0.5 to 100 g/10 min., alternatively from 0.5 to 50 g/10 min.

In some embodiments, both polyethylene components A) and C) have $M_w/M_n$ values equal to or less than 5.

In some embodiments, the molecular weight distribution of polyethylene components A) and C) is obtained directly in polymerization by using single-site catalysts, as described in Patent Cooperation Treaty Publication Nos. WO0121668 and WO2011089017, for polyethylene component A) and, as described in European Patent Publication No. EP1188762, for polyethylene component C).

In some embodiments, polyethylene component A) is prepared by polymerizing the relevant monomers with a polymerization catalyst made from or containing a cyclopentadienyl complex of chromium. In some embodiments, the cyclopentadienyl complex of chromium is made from or containing $\eta^5$-cyclopentadienyl moieties, alternatively [$\eta^5$-3,4,5-trimethyl-1-(8-quinolyl)-2 trimethyl silyl-cyclopentadienyl-chromium dichloride (CrQCp catalyst component). In some embodiments, polyethylene component C) is prepared by polymerizing the relevant monomers with a polymerization catalyst made from or containing a bis(imino) pyridine complex of chromium. In some embodiments, the bis(imino)pyridine complex of chromium is made from or containing 2,6-Bis-[1-(2,6-dimethylphenylimino)ethyl] pyridine chromium (III) trichloride (CrBIP catalyst component).

In some embodiments, the catalyst components are supported on a solid component.

In some embodiments, the support component are prepared using finely divided supports. In some embodiments, the supports are organic or inorganic solids. In some embodiments, the supports are selected from the group consisting of silica gel, magnesium chloride, aluminum oxide, mesoporous materials, aluminosilicates, hydrotalcites and organic polymers. In some embodiments, the organic polymers are selected from the group consisting of polyethylene, polypropylene, polystyrene, polytetrafluoroethylene and polymers bearing polar functional groups. In some embodiments, the polymers bearing polar functional groups are copolymers of ethylene and acrylic esters, acrolein or vinyl acetate. In some embodiments, the support materials have a specific surface area in the range from 10 to 1000 m$^2$/g, a pore volume in the range from 0.1 to 5 ml/g and a mean particle size of from 1 to 500 μm.

In some embodiments, the single-site catalyst components used for the preparation of the two polyethylene components A) and C) are applied to a joint support, thereby ensuring the spatial proximity of the catalyst centers and mixing of the different polymers formed.

In some embodiments, using the two catalyst components together on a joint support facilitates preparing a reactor blend of the polyethylene components A) and C) in a single polymerization step, without requiring a separate preparation and subsequent mechanical mixing of polymer fractions.

The polymerization product is therefore a masterbatch composition, hereinafter called "polyethylene composition (II)" containing the polyethylene components A) and C).

In some embodiments, the relative amounts of polyethylene components A) and C) are obtained by setting the relative amounts of the two single-site catalyst components, alternatively of CrQCp and CrBIP, thereby determining the amounts of A) and C) in the polyethylene composition (II) and consequently in the polyethylene composition (I) as well.

In some embodiments, the CrBIP/CrQCp molar ratio ranges from 0.1 to 20, alternatively from 0.3 to 10, alternatively from 0.5 to 8.

In some embodiments, the polyethylene composition (II) show the GPC peaks (1) and (2) as previously defined.

In some embodiments, polyethylene composition (II) has a $M_w/M_n$ value equal to or higher than 300, alternatively from 300 to 1,500.

In some embodiments, the two polyethylene components A) and C) are prepared separately by polymerizing the relevant monomers in the presence of the respective single-site catalysts.

In some embodiments, the two polyethylene components A) and C) are blended with polyethylene component B). In some embodiments, the two polyethylene components A) and C) are blended and polyethylene component B) is added subsequently. In some embodiments, the blending is achieved by mechanical mixing.

In some embodiments, the preparation of the supported catalyst is carried out by physisorption or a chemical reaction with reactive groups on the support surface. In some embodiments, the chemical reaction results in covalent binding of the components.

In some embodiments, the single-site component is contacted with the support in a solvent. In some embodiments, the contacting yields a soluble reaction product, an adduct or a mixture.

In some embodiments, the support materials, mode of preparation, and use for the preparation of supported catalyst are as described in Patent Cooperation Treaty Publication No. WO2005103096.

In some embodiments, the single-site catalyst components are contacted with an activator, thereby achieving the polymerization productivity. In some embodiments, the single-site catalyst components are selected from the CrQCp and CrBIP components. In some embodiments, the activator is selected from alumoxanes and non-alumoxane activators.

In some embodiments, the alumoxanes are open-chain alumoxane compounds of the formula (1):

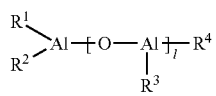

or cyclic alumoxane compounds of the formula (2):

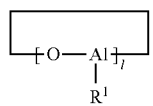

where $R^1$-$R^4$ are each, independently of one another, a $C_1$-$C_6$-alkyl group and I is an integer from 1 to 40, alternatively from 4 to 25. In some embodiments, the $C_1$-$C_6$-alkyl group is selected from the group consisting of methyl, ethyl, butyl and isobutyl groups.

In some embodiments, the alumoxane is methylalumoxane (MAO).

In some embodiments, the non-alumoxane activators are selected from the group consisting of alkyl aluminums, alkyl aluminum halides, anionic compounds of boron or aluminum, trialkylboron and triarylboron compounds. In some embodiments, the non-alumoxane activators are selected from the group consisting of triethylaluminum, trimethylaluminum, tri-isobutylaluminum, di ethyl aluminum chloride, lithium tetrakis (pentafluorophenyl) borate, triphenylcarbenium tetrakis (pentafluorophenyl) borate, lithium tetrakis (pentafluorophenyl) aluminate, tris (pentafluorophenyl) boron and tris (pentabromophenyl) boron.

In some embodiments, activators are used in an amount within the range of about 0.01 to about 10,000, alternatively from about 1 to about 5,000, moles per mole of the single-site catalyst.

In some embodiments, the activators are fed separately to the polymerization zone, supported on the supports during the preparation of the single-site catalyst and/or pre-contacted with the single-site catalyst.

In some embodiments, the polymerization process includes gas-phase polymerization, solution polymerization and suspension polymerization. In some embodiments, the gas-phase polymerization involves gas-phase fluidized-bed reactors. In some embodiments, the polymerization process involves loop reactors and stirred tank reactors. In some embodiments, the gas-phase polymerization is carried out in the condensed or supercondensed mode, wherein part of the circulating gas is cooled to below the dew point and recirculated as a two-phase mixture to the reactor. In some embodiments, a multizone reactor is used, wherein two polymerization zones are linked and the polymer is passed alternately through these two zones a number of times. In some embodiments, the two zones have different polymerization conditions. In some embodiments, the reactor is as described in Patent Cooperation Treaty Publication No. WO 97/04015. In some embodiments, the different or identical polymerization zones are connected in series, thereby forming a polymerization cascade. In some embodiments, a parallel reactor arrangement using two or more identical or different processes is used. In some embodiments, molar mass regulators or additives are used in the polymerizations. In some embodiments, the molar mass regulator is hydrogen. In some embodiments, the additives are antistatic compounds.

In some embodiments, the polymerization temperatures are in the range from −20 to 115° C., and the pressure is in the range from 1 to 100 bar.

In some embodiments and in the case of suspension polymerizations, the suspension medium is an inert hydrocarbon, mixtures of hydrocarbons, or the monomers. In some embodiments, the inert hydrocarbon is isobutane. In some embodiments, the solids content of the suspension is in the range from 10 to 80%. In some embodiments, the polymerization is carried out batchwise or continuously. In some embodiments, the batchwise polymerization occurs in stirring autoclaves. In some embodiments, the continuous polymerization occurs in tube reactors, alternatively in loop reactors.

In some embodiments, the polyethylene component B) is an ethylene homopolymer, an ethylene copolymer, or a blend thereof.

In some embodiments, the polyethylene component B) has a density of from 0.930 g/cm³ to 0.970 g/cm³.

In some embodiments, the $M_w/M_n$ values for the polyethylene component B) are from more than 5 to 65, alternatively from 8 to 60, alternatively from 8 to 25.

In some embodiments, the ethylene homopolymers and/or copolymers are prepared with catalysts, alternatively Ziegler-Natta or Chromium (Phillips) catalysts in one or more low pressure polymerization steps.

In some embodiments, the ethylene polymers are commercially available from Basell under the trademark Hostalen®, using a Ziegler-Natta polymerization catalyst.

In some embodiments, the Ziegler-Natta catalyst is made from or containing the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from compounds of Ti, V, Zr, Cr and Hf. In some embodiments, the transition metal compound is supported on $MgCl_2$.

In some embodiments, the catalysts are made from or containing the product of the reaction of the organometallic compound of group 1, 2 or 13 of the Periodic Table of elements, with a solid catalyst component made from or containing a Ti compound supported on $MgCl_2$.

In some embodiments, the organometallic compounds are alkyl aluminums.

In some embodiments, a mechanical mixing step is used to prepare the polyethylene composition (I), thereby incorporating polyethylene component B).

In some embodiments, the polyethylene composition (I) is produced directly in polymerization with one or more polymerization steps, in the presence of catalysts which produce polyethylene components A), B) and C), depending on the catalysts' different sensitivity to the molecular weight regulator (hydrogen) or changing the molecular weight regulator's concentration.

In some embodiments, the polyethylene composition (I) is further made from or containing auxiliaries or additives. In some embodiments, the additives are selected from the group consisting of processing stabilizers, stabilizers against the effects of light and heat, lubricants, antioxidants, anti-blocking agents, antistatic compounds, and dyes. In some embodiments, the additives are added in amounts of up to 6% by weight, alternatively of from 0.1 to 1% by weight, with respect to the weight of the polymer material and the additives.

In some embodiments, mixing of polyethylene components A), B) and C) is by introducing the powder components into a granulation apparatus and operating at a temperature at which the polyethylene composition is at least partially molten. In some embodiments, the temperature is from 180° C. to 220° C. In some embodiments, the granulation apparatus is selected from the group consisting of a twin-screw kneader (ZSK), a Farrel kneader, and a Kobe kneader.

In some embodiments, the MI (melt index) values for polyethylene components, A), B) and C) are broadly selected, provided that the MIE values of the overall composition are obtained.

In some embodiments, it is believed that the logarithm of the MI value of polyolefin blends is given by the sum of the products of the weight fraction and the logarithm of the MI value of the single components.

Thus the MIE value of a composition made of a blend of the said components A) and B) and C) is determined by the following relation:

log MIE $(A+B+C)=wA$ log MIE $(A)+wB$ log MIE $(B)+wC$ log MIE $(C)$ where MIE (A+B+C) is the MIE value for the blend of A), B) and C), MIE (A), MIE (B) and MIE (C) are the MIE values of components A), B) and C) respectively and wA, wB and wC are the respective weight fractions. For instance, wA, wB and wC are 0.5, 0.3 and 0.2 when the blend is made of 50% by weight of component A), 30% of component B) and 20% by weight of component C).

In some embodiments, MIE values for the polyethylene composition (II) are from 1 g/10 min. to 1000 g/10 min.

In some embodiments, MIE values for the polyethylene component B) are from 0.1 g/10 min. to 50 g/10 min.

Density is calculated by dividing the blend's weight by the blend's volume.

The volume is the sum of the ratios of each component's weight to each component's density.

Thus, for a blend of 50% by weight of component A) with density of 0.93 g/cm$^3$, 30% of component B) with a density of 0.95 g/cm$^3$ and 20% by weight of component C) with density of 0.94 g/cm$^3$, the total density will be:

100/(50/0.93+30/0.95+20/0.94)=0.94 g/cm$^3$.

In some embodiments, articles produced from polyethylene composition (I) are prepared by an extrusion additive manufacturing process wherein the polyethylene composition is at least partially molten. In some embodiments, the process temperature is from 180° to 280° C., alternatively 190° to 240° C. In some embodiments, the articles are filaments. In some embodiments, the articles are tailored protheses with adaptive areas. In some embodiments, the articles are used for hip joints, wherein the femur may be unidirectionally reinforced.

In some embodiments, the polyethylene composition (I) material is extruded and deposited as a sequence of layers to obtain the 3D article. When using an extrusion-based 3D printer, extrusion is carried out through an extrusion die carried by an extrusion head. In some embodiments, control of the deposition rate varies by setting the filament feed rate, filament cross sectional dimensions, and the rate of motion of the die head and/or article.

In some embodiments, the deposition is unidirectional or multidirectional.

In some embodiments, mechanical properties is controlled by the shear rate applied during extrusion.

In some embodiments, shear rate is equal to or greater than 120 s$^{-1}$, alternatively equal to or greater than 150 s$^{-1}$, alternatively equal to or greater than 200 s$^{-1}$. In some embodiments, the upper limit is 1000 s$^{-1}$.

In some embodiments and when carrying out uni- or multidirectional extrusion additive manufacturing, other unmixable polymers are added in one single printing process, thereby improving elongation at break or stiffness. In some embodiments, the other polymers are polypropylene or PVA.

EXAMPLES

These Examples are illustrative and not intended to limit the scope of this disclosure.

The following analytical methods are used to characterize the polymer compositions.

Melt Flow Index MIE

Determined according to ISO 1133-2:2011 at 190° C. with a load of 2.16 kg.

Density

Determined according to ISO 1183-1:2012 at 23° C.

Molecular Weight Distribution Determination via GPC

The determination of the molar mass distributions, including the GPC peak, and the means Mn, Mw and Mw/Mn derived therefrom was carried out by high-temperature gel permeation chromatography (GPC) using a method described in ISO 16014-1, -2, -4, issues of 2003. The solvent was 1,2,4-trichlorobenzene (TCB). The temperature of apparatus and solutions was 135° C. A PolymerChar (Valencia, Paterna 46980, Spain) IR-4 infrared detector was the concentration detector. A WATERS Alliance 2000 equipped with pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used.

The solvent was vacuum distilled under nitrogen and stabilized with 0.025% by weight of 2,6-di-tert-butyl-4-methylphenol (BHT). The flowrate used was 1 ml/min. The injection was 500 µl. The polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany) in the range from 580 g/mol up to 11600000 g/mol and additionally with hexadecane.

The calibration curve was then adapted to polyethylene (PE) by the Universal Calibration method (Benoit H., Rempp P. and Grubisic Z., & in J. Polymer Sci., Phys. Ed., 5, 753(1967)). The Mark-Houwing parameters used were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraße 36, D-55437 Ober-Hilbersheim, Germany) respectively.

Shear Rate

The shear rate $\dot{\gamma}$ applied to the polymer melt during the printing process was calculated by the following formula:

$$\dot{\gamma}=4*\dot{V}/\pi*r^3$$

wherein r indicates the radius of the nozzle (unit: mm) and $\dot{V}$ is the volumetric flow (unit: mm³/s).

The volumetric flow $\dot{V}$ was measured for the combinations of 3D printer, nozzle diameter, temperature, and printing speed (that is, extrusion speed). The polymer throughput $\dot{m}$ (unit: g/s) was measured gravimetrically and divided by the polymer melt density ρ (unit: g/mm³) according to the following equation: $\dot{V}=\dot{m}/\rho$ The polymer melt density ρ for melted polyethylene at temperature T (unit: ° C.) was calculated with the following equation (1): $\rho=[1.262+9.0*10^{-4}(T-125)]^{-1}*10^{-3}$ g/mm³.

Equation (1) is reported in Meissner, J. Hostettler, Rheol. Acta 1994, 33, 1-21.

Mechanical Properties: Young's Modulus and Tensile Strength

Mechanical properties were measured with tensile specimens DIN EN ISO 527-2 5A according to the procedure DIN EN ISO 527:2012. The tensile test machine used was Zwick Z005.

The test specimens were injection molded or 3D printed.

Two kinds of bone sized test specimens were prepared with 3D printing, namely:
i) unidirectional specimens, or
ii) multidirectional specimens.

For the unidirectional specimens i), the 3D printing was carried out with a filling pattern orientation at 0° or 90° relative to the stress (pulling) direction, which corresponds with the length of the test specimens.

For the multidirectional specimens ii), each 3D printed layer was deposited with alternate filling pattern orientation at 0° and 90° relative to the stress direction.

The injection molded test specimens were prepared by cutting the specimens from an injection molded plaque of the polymer material, with the length of each test specimen oriented at 0° or 90° relative to the injection flow.

The test specimens were clamped vertically after determination of the cross-sectional area and stretched to break.

The characteristics were determined from the stress-strain diagrams obtained. The bone sized test specimens were subjected to testing at a pulling speed of up to 50 mm/min. The data were evaluated with the software TESTXPERT II.

Examples 1-6 and Comparison Examples 1-2

Preparation of the Polyethylene Composition (II)

2,6-Bis-[1-(2,6-dimethylphenylimino)ethyl] pyridine chromium (III) trichloride (CrBIP) was synthesized according to Esteruelas M A, et al. Organometallics 2003; 22(3): 395-406.

[η⁵-3,4,5-trimethyl-1-(8-quinolyl)-2 trimethylsilyl-cyclopentadienyl-chromium dichloride (CrQCp) was synthesized according to: Enders et al. Organometallics 2004; 23(16): 3832-9, and Fernández et al. Organometallics 2007; 26(18): 4402-12.

Preparation of the Mixed Catalyst System

The mesoporous silica catalyst support (Sylopol XPO2107 of Grace) exhibiting a pore volume of 1.5 ml/g and specific surface of 400 m² g⁻¹, was dried in a Schlenk-tube in high-vacuum (10⁻³ bar) at 160° C. for 14 h. 20 mL of toluene were added, and the suspension was sonicated for 10 min. After adding of the calculated amount of MAO (Al:Cr=300:1), the mixture was stirred for 30 min and sonicated for 5 min. After sedimentation, the MAO-treated catalyst support was washed with dry toluene by removal and exchange of the supernatant. CrBIP was dissolved in toluene (0.2 mg mL⁻¹), pretreated with trimethylaluminum (TMA, 10 equiv.) and added by syringe. After stirring for 5 min, CrQCp in toluene (0.2 mg mL⁻¹) was also added and the mixture was stirred again for 5 min. After sedimentation, the activated catalyst was collected in n-heptane (20 mL), transferred into the reactor and the polymerization was started.

Two mixed catalysts were prepared, with different CrBIP/CrQCp molar ratio, obtained by dosing the respective solutions, namely:

Catalyst 1, with a CrBIP/CrQCp molar ratio of 0.8;
Catalyst 2, with a CrBIP/CrQCp molar ratio of 3.0.

Polymerization

Using the two catalysts, ethylene polymerizations were carried out in a 2.6 L steel reactor (HITEC ZANG) equipped with a mechanical stirrer, thermostatic and a software interface. Therefore, the reactor was heated in high-vacuum at 60° C. for 2 h, filled with n-heptane (580 mL) and tri-isobutylaluminum (TiBAl, 3 mL, 1 M in n-hexane) and was saturated with ethylene (5 bar). After transferring the prepared catalyst into the reactor, the polymerization was proceeded at 40° C., an ethylene pressure of 5 bar and stirring speed of 200 rpm for 120 min. The polymer was stabilized with BHT in methanol, filtered and dried under reduced pressure at 60° C. to constant weight.

The properties of the resulting polyethylene compositions (II), namely composition (II-1) with 33% by weight of A) and composition (II-2) with 63% by weight of A), depending upon the catalyst used, are reported in Table 1 below.

TABLE 1

| | | properties of Polyethylene Composition (II) | | | | | | |
|---|---|---|---|---|---|---|---|---|
| (II) type | Catalyst used | GPC peak (1) g/mol | GPC peak (2) g/mol | $M_w$ of A) g/mol | $M_w/M_n$ of A) | $M_w$ of C) g/mol | $M_w/M_n$ of C) | $M_w/M_n$ of (II) |
| (II-1) | Catalyst 1 | 1,200,000 | 890 | 2,000,000 | 3.5 | 1,200 | 3 | >500 |
| (II-2) | Catalyst 2 | 1,200,000 | 800 | 2,000,000 | 4 | 1,000 | 4 | >500 |

Component B)

The Polyethylene Component B) in the examples was a commercial HDPE, sold by Basell under the trademark Hostalen GC7260.

The HDPE was prepared in a slurry process with a Ziegler-Natta catalyst and had the following properties:
density: 0,9600 g/cm³;
MIE: 7.3 g/10 min.;
$M_w$: 90,500 g/mole;
$M_w/M_n$: 9.5.

Polyethylene Composition (I)

The polyethylene component B) and polyethylene compositions (II-1) and (II-2) respectively were mixed together by compounding, thus obtaining two examples of Polyethylene Composition (I), namely Composition 1 and Composition 2.

The compounding was carried out on a DSM XPLORE MICRO COMPOUNDER 15CC. Each 10.0 g of polymer was circulated with a residence time of 60 s and then extruded and granulated. The parameters used for the compounder are summarized in Table 2 below.

The properties of the resulting compositions are reported in Table 3 below.

TABLE 2

Parameters for compounding polyethylene components A) and polyethylene compositions (II) for further processing.

| Parameter | Value |
| --- | --- |
| T/° C. | 200 |
| Revolutions/Number/min | 100 |
| Filling/g | 10.0 |
| Residence Time/s | 60 |

TABLE 3

Polyethylene Composition (I)

| PE Composition (I) | Component B) Weight % | Precursor Composition (II-1) Weight % | Precursor Composition (II-2) Weight % | Density g/cm³ | MIE g/10' |
| --- | --- | --- | --- | --- | --- |
| Composition 1 | 70 | 30 | 0 | 0.9540 | 8 |
| Composition 2 | 85 | 0 | 15 | 0.9510 | 2.5 |

The amounts of polyethylene components A), B), and C) and the respective Mw values, are reported in Table 4 below.

TABLE 4

Polyethylene Composition (I) - fractionation

| Composition (I) | Composition 1 | Composition 2 |
| --- | --- | --- |
| A) [wt.-%] | 10 | 10 |
| Mw of A) [g/mol] ** | 2,000,000 | 2,000,000 |
| B) [wt.-%] | 74 | 87 |
| Mw of B) [g/mol] * | 90,500 | 90,500 |
| C) [wt.-%] | 16 | 3 |
| Mw of C) [g/mol] ** | 1,200 | 1,000 |

* Mw from GPC of Component B);
** Mw from GPC of Composition (II).

Each polyethylene composition (I) containing A), B) and C) is alternatively obtainable by co-supportation of three different catalyst precursor complexes as described in Markus Sturzel, Shahram Mihan, and Rolf Mülhaupt, Chem. Rev., 2016, 116 (3), pp 1398-1433.

Filament Extrusion

The comparison filament for 3D printing was produced from granules of the component B) on a twin-screw extruder COLLIN TEACH-LINE™ ZK 25T with a round die (2.80 mm diameter). The extruded polymer strand was withdrawn, water cooled and rolled up on printer coils. The parameters used are listed in Table 5 below.

TABLE 5

Parameters for producing the filament of Polyethylene Component B)

| Parameter | Value |
| --- | --- |
| $T_{Zone\ 1}$/° C. | 190 |
| $T_{Zone\ 2}$/° C. | 200 |
| $T_{Zone\ 3}$/° C. | 200 |
| $T_{Zone\ 4}$/° C. | 190 |
| Revolutions/Number/min | 20 |
| Feed Rate/kg/h | 0.5 |
| Output/mm/s | 52 |

The extrusion of the filament for 3D printing was carried out on a RANDCASTLE RCP-MT250 single-screw mini extruder with a round die (2.30 mm diameter). The samples of Polyethylene Composition (I) were fed to the extruder, after prior milling, without metering. The extruded polymer strand was withdrawn, water cooled and rolled up on printer coils. The extrusion parameters used are listed in Table 6 below.

TABLE 6

Extrusion parameters for producing filaments of the polyethylene composition (I)

| Parameter | Value |
| --- | --- |
| $T_{Zone\ 1}$/° C. | 190-200 |
| $T_{Zone\ 2}$/° C. | 180-200 |
| $T_{Zone\ 3}$/° C. | 180-200 |
| Revolutions/Number/min | 100-120 |
| Output/mm/s | 7-8 |

Milling

Before extrusion, the samples of Polyethylene Composition (I) were ground to a particle size of approximately 0.1 mm. Milling was carried out in two steps: First, a particle size of 1 mm was achieved by a granulator 1514 from RAPID. Subsequently, the powder was cooled in liquid nitrogen and comminuted to a particle size of 0.1 mm using a rotary mill ZM200 from RETSCH (12-pin blade, 16,000 rpm, 0.5 mm sieve).

FDM (Fused Deposition Modeling) 3D Printing

FDM printed test specimens were produced with an Ultimaker 2+ FDM printer using 100% infill and a nozzle of 0.8 mm diameter leading to a line width of 0.7 mm. The layer thickness was 0.2 mm. Printing temperature and speed were adapted to obtain certain mechanical properties.

Injection Molding

Injection molding of the test specimens for the comparison examples was performed on a DSM Xplore Micro Compounder 5 cc together with the injection molding system DSM Xplore 10 cc at 220° C., 8 bar and 8 s of holding pressure. The mold temperature was 60° C.

The polyethylene materials respectively used in the examples are reported in Table 7.

Tables 8 to 10 report the processing conditions and the test results.

TABLE 7

| Example | Process | Polyethylene material |
| --- | --- | --- |
| 1 | FDM unidirectional | Composition 1 |
| 2 | FDM unidirectional | Composition 1 |
| 3 | FDM multidirectional | Composition 1 |
| 4 | FDM unidirectional | Composition 2 |

TABLE 7-continued

| Example | Process | Polyethylene material |
|---|---|---|
| 5 | FDM unidirectional | Composition 2 |
| 6 | FDM unidirectional | Composition 2 |
| Comparison 1 | injection molding | 100% Component B) |
| Comparison 2 | injection molding | Composition 1 |

TABLE 8

| | | Processing conditions | | | Printing orientation relative to stress test direction |
|---|---|---|---|---|---|
| Example | Process | T [° C.] | printing speed [mm/s] | shear rate [s$^{-1}$] | |
| 1 | FDM unidirectional | 210 | 150 | 450 | 0° |
| 2 | FDM unidirectional | 210 | 150 | 450 | 90° |
| 3 | FDM multidirectional | 210 | 150 | 450 | — |
| 4 | FDM unidirectional | 210 | 25 | 110 | 0° |
| 5 | FDM unidirectional | 210 | 100 | 270 | 0° |
| 6 | FDM unidirectional | 210 | 150 | 450 | 0° |

TABLE 9

| | | Printing orientation relative to stress test direction | Mechanical properties | |
|---|---|---|---|---|
| Example | Process | | Young's-Modulus [MPa] | Strength [MPa] |
| 1 | FDM unidirectional | 0° | 2000 ± 180 | 82 ± 10 |
| 2 | FDM unidirectional | 90° | 1260 ± 40 | 43.7 ± 0.2 |
| 3 | FDM multidirectional | — | 1800 ± 110 | 64 ± 10 |
| 4 | FDM unidirectional | 0° | 1300 ± 60 | 54 ± 2 |
| 5 | FDM unidirectional | 0° | 1400 ± 160 | 70 ± 2 |
| 6 | FDM unidirectional | 0° | 2040 ± 180 | 96 ± 12 |

TABLE 10

| | | Injection direction relative to stress test direction | Mechanical properties | |
|---|---|---|---|---|
| Example | Process | | Young's-Modulus [MPa] | Strength [MPa] |
| Comp. 1 | Injection molding | 0° | 1010 ± 13 | 26.7 ± 0.2 |
| | | 90° | 1018 ± 10 | 26.3 ± 0.4 |
| Comp. 2 | Injection molding | 0° | 2370 ± 90 | 97 ± 5 |
| | | 90° | 1030 ± 50 | 28 ± 3 |

Comp. = Comparison

What is claimed is:

1. An extrusion additive manufacturing process comprising:

the step of extruding a polyethylene composition (I) having a melt flow index MIE at 190° C. with a load of 2.16 kg, according to ISO 1133-2:2011, of at least 0.1 g/10 min., wherein the polyethylene composition (I) comprises A) from 1% to 40% by weight of a polyethylene component having a weight average molar mass $M_w$, as measured by GPC (Gel Permeation Chromatography), equal to or higher than 1,000,000 g/mol;

B) from 1% to 95% by weight of a polyethylene component having a $M_w$ value from 50,000 to 500,000 g/mol; and C) from 1% to 59% by weight of a polyethylene component having a $M_w$ value equal to or lower than 5,000 g/mol;

wherein the amounts of components A), B) and C) are referred to the total weight of A)+B)+C).

2. The extrusion additive manufacturing process of claim 1, wherein the extruding step is carried out using a FDM 3-D printer.

3. The extrusion additive manufacturing process of claim 1, wherein the polyethylene composition (I) has a density, determined according to ISO 1183-1:2012 at 23° C., of from 0.900 to 0.965 g/cm$^3$.

4. The extrusion additive manufacturing process of claim 1, wherein the polyethylene component A) is an ethylene homopolymer.

5. The extrusion additive manufacturing process of claim 1, wherein the weight ratio A)/C) is 5 or lower.

6. The extrusion additive manufacturing process of claim 1, wherein the shear rate applied during extrusion is equal to or greater than 120 s-1.

7. A filament for use in an extrusion additive manufacturing process, comprising a polyethylene composition (I) having a melt flow index MIE at 190° C. with a load of 2.16 kg, according to ISO 1133-2:2011, of at least 0.1 g/10 min., wherein the polyethylene composition (I) comprises:

A) from 1% to 40% by weight of a polyethylene component having a weight average molar mass $M_w$, as measured by GPC (Gel Permeation Chromatography), equal to or higher than 1,000,000 g/mol;

B) from 1% to 95% by weight of a polyethylene component having a $M_w$ value from 50,000 to 500,000 g/mol; and C) from 1% to 59% by weight of a polyethylene component having a $M_w$ value equal to or lower than 5,000 g/mol;

wherein the amounts of components A), B) and C) are referred to the total weight of A)+B)+C).

8. A printed article obtained from the process of claim 1.

* * * * *